United States Patent
Lambert et al.

(10) Patent No.: US 10,075,410 B2
(45) Date of Patent: Sep. 11, 2018

(54) APPARATUS AND METHODS FOR ASSIGNING INTERNETWORK ADDRESSES

(71) Applicant: Marvell World Trade Ltd., St. Michael (BB)

(72) Inventors: Paul A. Lambert, Mountain View, CA (US); Anup Kulkarni, Maharashtra (IN)

(73) Assignee: Marvell World Trade Ltd., St. Michael (BB)

( * ) Notice: Subject to any disclaimer, the term of this patent is extended or adjusted under 35 U.S.C. 154(b) by 76 days.

(21) Appl. No.: 15/153,666

(22) Filed: May 12, 2016

(65) Prior Publication Data
US 2016/0344681 A1    Nov. 24, 2016

Related U.S. Application Data
(60) Provisional application No. 62/163,015, filed on May 18, 2015.

(51) Int. Cl.
*H04W 4/00* (2018.01)
*H04L 29/12* (2006.01)

(52) U.S. Cl.
CPC ........ *H04L 61/103* (2013.01); *H04L 61/2015* (2013.01); *H04L 61/6009* (2013.01)

(58) Field of Classification Search
None
See application file for complete search history.

(56) References Cited

U.S. PATENT DOCUMENTS

| | | |
|---|---|---|
| 5,708,655 A | 1/1998 | Toth |
| 6,728,232 B2 | 4/2004 | Hasty |
| 6,993,583 B2 | 1/2006 | Anderson |
| 7,660,258 B2 | 2/2010 | Cho |

(Continued)

FOREIGN PATENT DOCUMENTS

WO    WO2010083887 A1    7/2010

OTHER PUBLICATIONS

"IEEE 802.11", Wikipedia, downloaded from the Internet, https://en.wikipedia.org/wiki/IEEE_802.11, Nov. 16, 2015, 13 Pages.

(Continued)

*Primary Examiner* — Otis L Thompson, Jr.

(57) ABSTRACT

According to an aspect, an access point data processing apparatus includes: a cache memory to store internetwork addresses of an internetwork in association with local network addresses of a local computing device network; and processor electronics configured to receive a client network address of a client device to be connected with the internetwork through the access point, select one of the local network addresses to associate with the client network address of the client device, store the client network address in the cache memory in association with the selected one of the local network addresses, identify an internetwork addresses associated with the selected one of the local network addresses, provide the identified internetwork address to the client device, and direct network communications to and from the client device in accordance with the association between the client network address and the selected one of the local network addresses.

26 Claims, 4 Drawing Sheets

(56) References Cited

U.S. PATENT DOCUMENTS

| | | | |
|---|---|---|---|
| 7,793,005 B1 | 9/2010 | Fernald | |
| 8,006,276 B2 | 8/2011 | Nakagawa | |
| 8,036,520 B2 | 10/2011 | Narukawa | |
| 8,095,671 B2 | 1/2012 | Balogh | |
| 8,102,826 B2 | 1/2012 | Lee | |
| 8,116,233 B2 | 2/2012 | Lambert | |
| 8,166,296 B2 | 4/2012 | Buer | |
| 8,238,315 B2 | 8/2012 | Lambert | |
| 8,364,831 B2 | 1/2013 | Balogh | |
| 8,392,850 B2 | 3/2013 | Nakagawa | |
| 8,446,843 B2 | 5/2013 | Lambert | |
| 8,451,862 B2 | 5/2013 | Huang | |
| 8,732,283 B2 | 5/2014 | Lambert | |
| 8,812,723 B2 | 8/2014 | Lambert | |
| 8,886,833 B1 | 11/2014 | Kopikare | |
| 9,055,430 B2 | 6/2015 | Lambert | |
| 9,137,255 B2 | 9/2015 | Lambert | |
| 9,571,199 B1 | 2/2017 | Bannon et al. | |
| 9,681,374 B2 | 6/2017 | Cui et al. | |
| 9,756,682 B2 | 9/2017 | Iyer et al. | |
| 2001/0003191 A1 | 6/2001 | Kovacs | |
| 2003/0081578 A1 | 5/2003 | White | |
| 2004/0213271 A1 | 10/2004 | Lovy | |
| 2004/0240474 A1 | 12/2004 | Fan | |
| 2005/0188069 A1 | 8/2005 | Mohandas | |
| 2005/0191990 A1 | 9/2005 | Willey | |
| 2006/0256717 A1 | 11/2006 | Caci | |
| 2006/0267936 A1 | 11/2006 | Hoerl | |
| 2007/0204021 A1 | 8/2007 | Ekl | |
| 2008/0205649 A1 | 8/2008 | Harris | |
| 2009/0234910 A1 | 9/2009 | Chung | |
| 2010/0031318 A1 | 2/2010 | Gardcia | |
| 2010/0054154 A1 | 3/2010 | Lambert | |
| 2010/0067509 A1 | 3/2010 | Lambert | |
| 2010/0260146 A1* | 10/2010 | Lu | H04L 12/4633 370/331 |
| 2010/0296441 A1* | 11/2010 | Barkan | H04W 12/08 370/328 |
| 2011/0103302 A1 | 5/2011 | Hall | |
| 2011/0282998 A1 | 11/2011 | Johnsson | |
| 2011/0292922 A1 | 12/2011 | Yang | |
| 2012/0213211 A1* | 8/2012 | Remaker | H04L 63/0421 370/338 |
| 2012/0314621 A1 | 12/2012 | Finn et al. | |
| 2014/0050209 A1* | 2/2014 | Bajko | H04L 29/12283 370/338 |
| 2014/0229634 A1 | 8/2014 | Lambert | |
| 2014/0269476 A1 | 9/2014 | Weston et al. | |
| 2015/0195198 A1 | 7/2015 | Shin et al. | |
| 2015/0281947 A1* | 10/2015 | Patil | H04W 8/26 370/329 |
| 2016/0112947 A1 | 4/2016 | Sahoo et al. | |
| 2016/0269359 A1* | 9/2016 | Adrangi | H04L 61/6022 |
| 2016/0330165 A1* | 11/2016 | Jeanne | H04L 61/103 |
| 2017/0171111 A1 | 6/2017 | Khare et al. | |

OTHER PUBLICATIONS

"IEEE P802.11—Task Group AI—Meeting Update", IEEE P802.11 FIA Study Group, downloaded from the Internet, http://www.ieee802.org/11/Reports/tgai_update.htm, Nov. 2, 2015, 29 pages.

"IEEE 802.11ai", Wikipedia, downloaded from the Internet, https://en.wikipedia.org/wiki/IEEE_802.11ai, Nov. 2, 2015, 1 page.

"Dynamic Host Configuration Protocol", Wikipedia, downloaded from the Internet, https://en.wikipedia.org/wiki/Dynamic_Host_Configuration_Protocol, Nov. 2, 2015, 19 pages.

U.S. Appl. No. 15/166,188, Office Action dated Dec. 6, 2017, 12 pages.

Chen et al., "Scalable Address Allocation Protocol for Mobile Ad Hoc Networks," 2009, Fifth International Conference on Mobile Ad-hoc and Sensor Networks, IEEE Computer Society, 41-48, 8 pages.

Johnson, et al., "Subnet Allocation Option" Internet Engineering Task Force, Internet Society (ISOC), May 13, 2010, pp. 1-30.

Mohsin et al., "IP address assignment in a mobile ad hoc network", IEEE Military Communications Conference, Oct. 7, 2002, pp. 856-861.

IBSS with Wi-Fi Protected Setup Technical Specification v.1.0.0, Wi-Fi Alliance Technical Committee IBSS with Wi-Fi Protected Setup Technical Task Group, 2012, 76 pages.

* cited by examiner

APPARATUS AND METHODS FOR ASSIGNING INTERNETWORK ADDRESSES

CROSS REFERENCE TO RELATED APPLICATIONS

This application claims the benefit of the priority of U.S. Provisional Application Ser. No. 62/163,015, filed May 18, 2015 and entitled "MAC ADDRESS TRANSLATION FOR RAPID IP ASSIGNMENT", which is incorporated herein by reference.

BACKGROUND

The present disclosure describes systems and techniques relating to assigning internetwork addresses to devices that connect with an internetwork.

A computer network is a group of computing devices that connect with each other through a communications medium. Various protocols and standards can be used by such devices to connect and communicate with each other over the medium, but in general, each such computing device needs at least one address that identifies the device on the network. For example, Ethernet is a family of computer networking technologies for local area networks (LANs) in which each device on a given network has a media access control (MAC) address for its network interface, and the MAC address is used to identify the device for communications on the physical network segment.

In addition, multiple networks can be connected together in an internetwork, such as the Internet. The networks that form an internetwork are controlled by different parties, use different networking protocols, and have overlapping address spaces. Thus, a device that connects to an internetwork through a network needs an internetwork address in addition to its network address. The definition and use of such internetwork addresses is governed by an appropriate protocol, such as the Internet Protocol (IP) (e.g., IPv4 or IPv6).

SUMMARY

The present disclosure describes systems and techniques relating to assigning internetwork addresses to devices that connect with an internetwork. According to an aspect of the described systems and techniques, an access point data processing apparatus includes: a cache member configured to store a set of internetwork addresses of an internetwork in association with a set of preselected local network addresses of a local computing device network; and processor electronics coupled with the cache memory, the processor electronics configured to receive a client network address of a client device to be connected with the internetwork through the access point data processing apparatus, select one of the local network addresses to associate with the client network address of the client device, store the client network address in the cache memory in association with the selected one of the local network addresses, identify in the cache memory an internetwork addresses associated with the selected one of the local network addresses, provide the identified internetwork address to the client device, and direct network communications to and from the client device in accordance with the association between the client network address and the selected one of the local network addresses.

The processor electronics can be further configured to generate the set of local network addresses, request the set of internetwork addresses using the generated set of local network addresses using a dynamic address assignment protocol, receive the set of internetwork addresses in accordance with the dynamic address assignment protocol, and store the received internetwork addresses in the cache memory in association with the local network addresses. The local network addresses can be Ethernet Media Access Control (MAC) addresses, the internetwork addresses can be Internet Protocol (IP) addresses, and the dynamic address assignment protocol can be Dynamic Host Configuration Protocol (DHCP). Further, the access point data processing can be configured to be a DHCP proxy for client devices connecting to the Internet through the access point data processing apparatus.

The client network address can be a first client network address for the client device, and the processor electronics can be further configured to identify a second client network address for the client device that replaces the first client network address, associate the second client network address with the selected one of the local network addresses, and direct further network communications to and from the client device in accordance with the association between the second client network address and the selected one of the local network addresses. The processor electronics can be configured to associate the second client network address with the selected one of the local network addresses by making an archive copy of the first network address from the cache memory and then replacing the first client network address with the second client network address in the cache memory.

The access point data processing apparatus can be a WiFi access point. The access point data processing apparatus can include an integrated circuit (IC) device including the cache memory and the processor electronics. Moreover, the access point data processing apparatus can include a non-transitory computer-readable medium, wherein the processor electronics including a hardware processor programmed with instructions stored in the non-transitory computer-readable medium.

According to another aspect, a method includes; requesting a set of internetwork addresses using a set of local network addresses of a local computing device network, wherein the requesting includes using a dynamic address assignment protocol, and each local network address in the set of local network addresses is not assigned to any device on the local computing device network; receiving the set of internetwork addresses for an internetwork in accordance with the dynamic address assignment protocol; storing, by an access point (AP) of the local computing device network, the set of internetwork addresses in association with the set of local network addresses; receiving, by the AP of the local computing device network, a client network address of a client device to be connected with the internetwork through the AP; selecting, by the AP of the local computing device network, one of the local network addresses to associate with the client network address of the client device; storing, by the AP of the local computing device network, the client network address in association with the selected one of the local network addresses; identifying, by the AP of the local computing device network, one of the stored internetwork addresses that was previously associated with the selected one of the local network addresses; providing, by the AP of the local computing device network, the identified internetwork address to the client device; and directing, by the AP of the local computing device network, network communications to and from the client device in accordance with the association between the client network address and the selected one of the local network addresses.

The method can include generating, by the AP of the local computing device network, the set of local network addresses. The local network addresses can be Media Access Control (MAC) addresses, the internetwork addresses can be Internet Protocol (IP) addresses, and the dynamic address assignment protocol can be Dynamic Host Configuration Protocol (DHCP). Further, providing the identified internetwork address to the client device can include providing a previously cached IP address in a DHCP response to a DHCP request from the client device without having sent a DHCP request to the local computing device network using a MAC address of the client device.

The client network address can be a first client network address for the client device, and the method can include: identifying a second client network address for the client device that replaces the first client network address; associating the second client network address with the selected one of the local network addresses; and directing further network communications to and from the client device in accordance with the association between the second client network address and the selected one of the local network addresses. Further, associating the second client network address with the selected one of the local network addresses can include: making an archive copy of the first client network address; and replacing the first client network address with the second client network address in a cache that associates client network addresses with the local network addresses. Moreover, the AP can be a WiFi access point.

According to another aspect, a system includes: a local computing device network coupled with an internetwork; and an access point (AP) for the local computing device network, wherein the AP is configured to (i) request a set of internetwork addresses using a set of local network addresses using a dynamic address assignment protocol, (ii) receive the set of internetwork addresses in accordance with the dynamic address assignment protocol, (iii) store the received internetwork addresses in association with the set of local network addresses, (iv) receive a client network address of a client device to be connected with the internetwork through the AP, (v) select one of the local network addresses to associate with the client network address of the client device, (vi) store the client network address in association with the selected one of the local network addresses, (vii) identify one of the stored internetwork addresses that was previously associated with the selected one of the local network addresses, (viii) provide the identified internetwork address to the client device, and (ix) direct network communications to and from the client device in accordance with the association between the client network address and the selected one of the local network addresses.

The dynamic address assignment protocol can be Dynamic Host Configuration Protocol (DHCP), and the AP can act as a DHCP proxy for client devices connecting to the Internet through the AP. The client network address can be a first client network address for the client device, and the AP can be further configured to identify a second client network address for the client device that replaces the first client network address, associate the second client network address with the selected one of the local network addresses, and direct further network communications to and from the client device in accordance with the association between the second client network address and the selected one of the local network addresses. Furthermore, the AP can be configured to associate the second client network address with the selected one of the local network addresses by making an archive copy of the first network address and then replacing the first client network address with the second client network address in a cache that associates client network addresses with the local network addresses.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable hardware processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus. For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit).

The described systems and techniques can result in one or more of the following advantages. A device can be connected to the Internet through an access point more quickly. Coordination and compatibility of operations in a networking system can be simplified. In addition, client device privacy can be improved, even while including archival of changes in network address details for client devices.

Details of one or more implementations are set forth in the accompanying drawings and the description below. Other features and advantages may be apparent from the description and drawings, and from the claims.

DETAILED DESCRIPTION

Figure 1A:
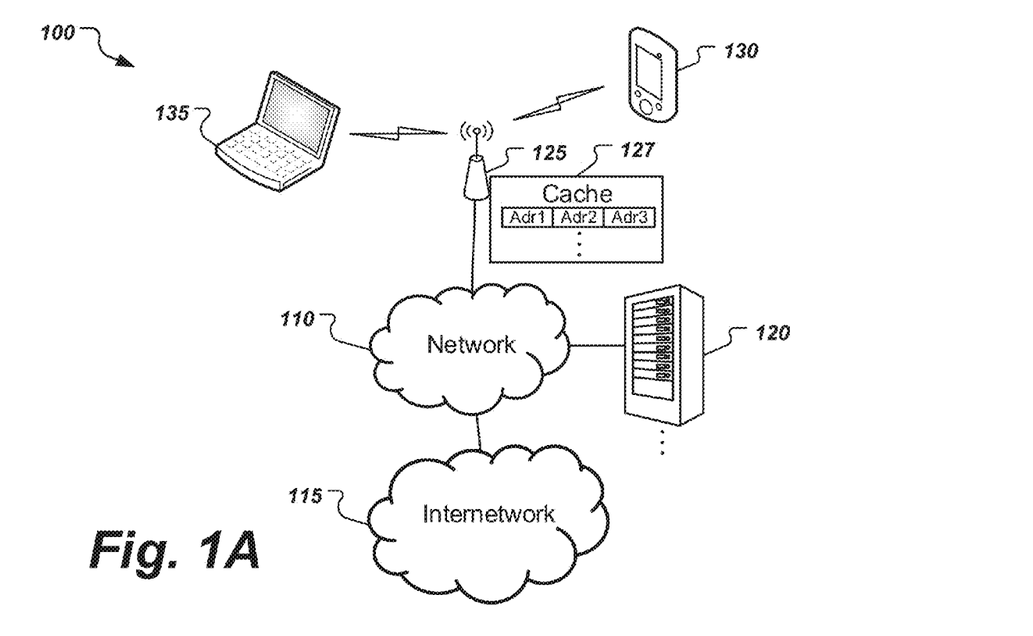
FIG. 1A shows an example of a communication system.

FIG. 1A shows an example of a communication system 100. A network 110 connects with an internetwork 115, allowing computing devices that are connected with the network 110 to communicate with computing devices that are connected with the internetwork 115. For example, the network 110 can be an Ethernet LAN (Local Area Network), and the internetwork 115 can be the Internet. In addition, the network 110 can include an access point GAP) 125, which is a computing device that allows other devices to connect to the network 110 through the AP 125.

In the example shown, the AP 125 is a wireless AP (e.g., a WiFi router), but other implementations can use other types of wired and/or wireless access points. Further, in some implementations, the AP 125 does not have a direct physical connection with the network 110, but rather is part of a Wireless LAN, which can include an Extended Service Set (ESS) that links different Basic Service Sets (BSSes) together. In general, the AP 125 provides access to the network 110 for one or more client devices 130, 135. The client devices 130, 135 can be various types of computing devices, such as a smartphone 130 and a laptop 135. The client devices 130, 135 connect to the AP 125 in order to get access to the network 110 as well as to get access to the internetwork 115.

When a device 130, 135 connects to the AP 125, a number of different phases are needed to establish the connection before data can be communicated through the network 110. These phases can include discovery, connection, and authentication/security checks. In some implementations, these phases can be accelerated using the Fast Initial Link Setup (FILS) defined in the Institute of Electrical and Electronics Engineers (IEEE) 802.11ai standard. Further, it should be noted that, even when the device 130, 135 is already connected to the AP 125, e.g., at the WiFi level, the device 130, 135 cannot begin communications across the internetwork 115 if it does not yet have an internetwork address assigned to it.

To obtain an internetwork address for a device 130, 135, a dynamic address assignment protocol, such as Dynamic Host Configuration Protocol (DHCP), can be used. For example, the AP 125 can use the MAC address of a device 130 in a DHCP request to obtain an IP address for the device 130. Unfortunately, this process of obtaining an IP address can take a substantial amount of time, e.g., one to three seconds, which is sufficient to degrade the experience of the user of the device 130. The network 110 can have multiple DHCP servers 120, which have their own conventions of determining redundancy, and the DHCP protocol involves broadcasting a MAC address on the network 110 to get an IP address for the device. The servers 120 keep tables of MAC and IP addresses, and delay is introduced because of the use of broadcast messages and the need to wait and see if one or more DHCP servers 120 respond. Note that, traditionally, the AP 125 would not be able to provide an IP address right away because the AP 125 does not control the IP address space.

Furthermore, the time needed to obtain internetwork addresses for connecting devices 130, 135 can be even more noticeable in light of the reduced amount of time needed to establish the initial connection between the devices 130, 135 and the AP 125 (e.g., using FILS). Thus, to address this issue, the AP 125 can employ systems and techniques to provide internetwork addresses to connect devices 130, 135 more rapidly. The AP 125 can obtain a set of internetwork address (e.g., five to six IP addresses, in some implementations) before the devices 130, 135 even attempt to connect to the AP 125. The AP 125 can request IP addresses from the DHCP servers 125 in advance and then cache the received IP addresses in a non-transitory computer-readable medium 127 for later use in association with MAC addresses (e.g., Adr1=MAC address of device 130, Adr2=preselected MAC address, and Adr3=previously associated IP address).

Figure 1B:
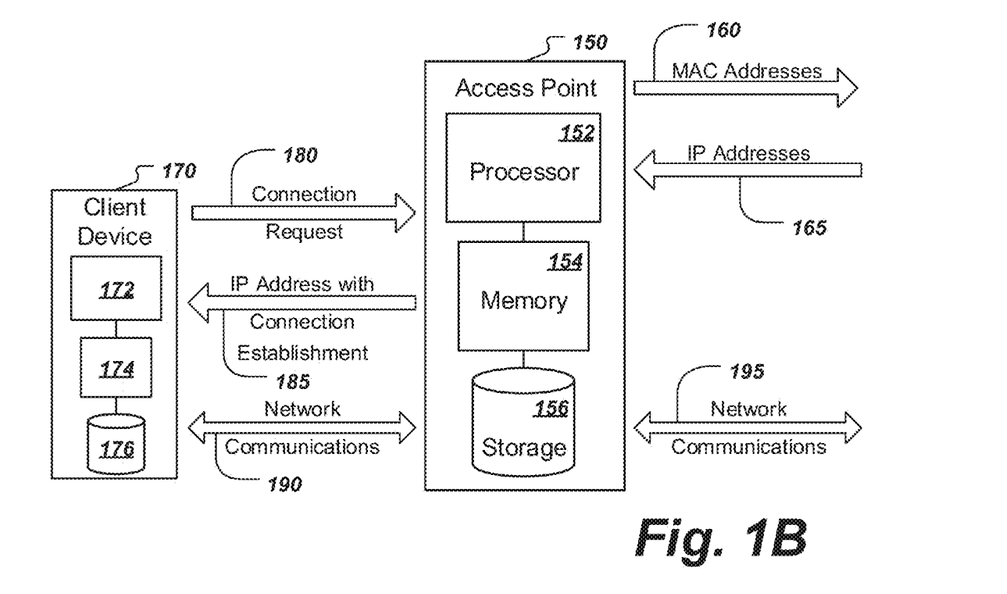
FIG. 1B shows an example of an access point interacting with an internetwork and a client device.

FIG. 1B shows an example of an access point 150 interacting with an internetwork and a client device 170. The access point 150 can be a WiFi AP or other AP, The access point 150 includes one or more hardware processors 152 (e.g., a single central processing unit (CPU) on a system on chip (SoC), a multi-core processor, etc.) and a non-transitory computer-readable medium 154 (e.g., a memory device 154, a storage device 156, a machine-readable storage substrate, or other physical, machine-readable medium, or a combination of one or more of them). The client device 170 can be smartphone, a tablet computer, a laptop computer, or other computing device. The client device 170 includes one or more hardware processors 172 (e.g., a single CPU on a SoC, a multi-core processor, etc.) and a non-transitory computer-readable medium (e.g., a memory device 174, a storage device 176, a machine-readable storage substrate, or other physical, machine-readable medium, or a combination of one or more of them).

The access point 150 sends out 160 a set of MAC addresses in order to receive back 165 a set of IP addresses. This can involve sending individual DHCP requests for individual MAC addresses. This process can be a pre-configuration process that occurs just after the access point 150 connects to the network, an ongoing process that occurs periodically, or both. For example, the access point 150 can periodically release the IP addresses it has cached and obtain new ones, or this process can be triggered by certain events that occur on the network.

The MAC addresses that are sent 160 are not actually assigned to any device on the network, and can thus be viewed as placeholder addresses that are used by the access point 150 to reserve some IP addresses for later use. The placeholder MAC addresses used by the access point 150 can be pre-assigned to the access point 150, e.g., during manufacture or configuration of the access point 150. In some implementations, the placeholder MAC addresses can be assigned to the access point 150 using a protocol developed for use by multiple access points that connect to a network. In addition, the number of placeholder addresses used by an access point 150 can vary from implementation to implementation and can be a predetermined number, and/or the number of placeholder addresses can vary during operation, as may be determined by network conditions.

The placeholder MAC addresses and the assigned IP addresses are stored in association with each other at the access point 150. Then, when the client device 170 sends a connection request 180, the access point 150 can select one of the placeholder MAC addresses to associate with the MAC address of the client device 170. This association of the two MAC addresses can be done solely by the access point 150, without input from any other entity on the network. Moreover, since the access point 150 already has an IP address cached in association with the selected placeholder MAC address, the access point 150 can also rapidly provide that previously associated IP address to the client device 170 without input from any other entity.

For example, the previously associated IP address can be provided to the client device 170 with the connection establishment 185 between the client device 170 and the access point 150. This can be done in one of the messages used in the control setup, e.g., in one of the messages in the four way handshake of IEEE 802.11, or in one of the messages in FILS of IEEE 802.11ai. In some implementations, the previously associated IP address can he provided to the client device 170 in a message that is formatted as a DHCP response (assigning an IP address to the client device 170) to a DHCP request from the client device 170, even though no DHCP request is sent by the access point 150 to the network using the MAC address of the client device 170. Thus, the access point 150 can act as a DHCP proxy.

After the association of the client MAC address with a placeholder MAC address, and thus with the placeholder MAC address's assigned IP addresses, network communications 190 between the client device 170 and the access point 150 can proceed using the assigned IP address and the MAC address of the client device 170. At the access point 150, the MAC address of the client device 170 can be translated to the placeholder MAC address for use in the corresponding network communications 195 on the network. In addition, the MAC address of the client device 170 can be changed during the network communications 190, and the access point 150 can update its cache by associating the new MAC address of the client device 170 with the placeholder MAC address that was previously-picked for the client device 170.

For example, various technologies can be used to dynamically change the MAC address of the client device 170 to provide privacy, and the access point 150 can accommodate these MAC address changes through updating of its cache of address associations, and potentially, retaining an archive of the MAC address translations performed during network communications 190 (or over longer periods of time). This can simplify coordination and compatibility of operations in the networking system, as some service providers on the network and the internetwork may require that a MAC address of a client device remain the same (for at least a defined period of time or during at least a specified session) to provide the service, and the access point's remapping of MAC addresses can thus allow the MAC address of the client device 170 to change at any time since the access point 150 will continue to present the same placeholder MAC address (and the same assigned IP address therefor) to the service providers.

Figure 2A:
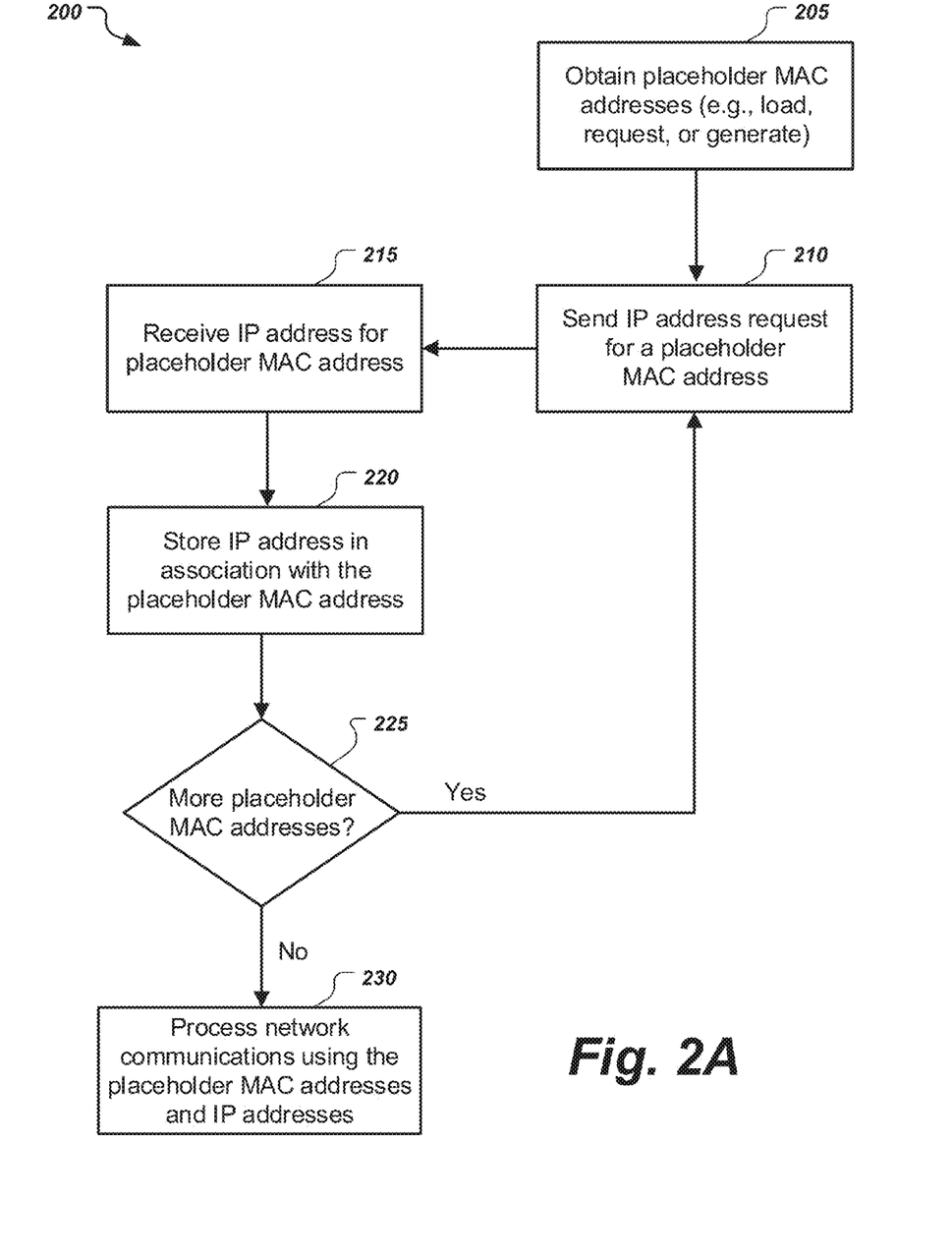
FIG. 2A shows an example of a process to pre-cache IP addresses.

FIG. 2A shows an example of a process 200 to pre-cache IP addresses. The process 200 can be implemented in software, firmware, hardware, or any combination thereof. The process 200 can be implemented by an access point, according to some embodiments. For example, the process 200 can be implemented by the access point 150. At 205, an access point obtains placeholder MAC addresses. This can involve loading the placeholder MAC addresses (e.g., from permanent storage), requesting and receiving the placeholder MAC addresses from another entity on the network, or generating the MAC addresses by the access point. Once the placeholder MAC addresses are obtained, or as the placeholder MAC addresses are being obtained, IP addresses can be requested for computing devices that will be associated with the placeholder MAC addresses in the future.

At 210, the access point sends an IP address request for a placeholder MAC address. This can involve sending a DHCP request for an IP address for the next placeholder MAC address. At 215, the access point receives an IP address for the placeholder MAC address. For example, a response can be received from a DHCP server that assigns an IP address for the placeholder MAC address.

At 220, the access point stores the received IP address in association with the placeholder MAC address. This can involve associating the received IP address with the placeholder MAC address by saving the received IP address in a cache table. At 225, the access point determines whether there are any more placeholder MAC addresses without an assigned IP address (e.g., does the cache table have an unfilled IP address slot for any of the placeholder MAC addresses). If so, the process continues at 210. When all the placeholder MAC addresses have assigned IP addresses, the process 200 proceeds to 230 with further processing of network communications using the placeholder MAC addresses and their assigned IP addresses.

Figure 2B:
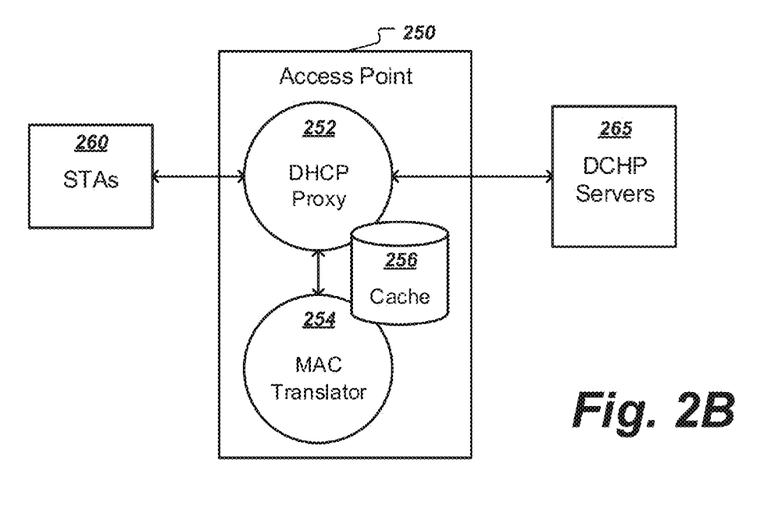
FIG. 2B shows an example of an access point with a Dynamic Host Configuration Protocol (DHCP) proxy.

As noted above, an access point can act as a DHCP proxy, and so the process 200 can employ DHCP. FIG. 2B shows an example of an access point (AP) 250 with a DHCP proxy 252, which handles communications between stations (STAs) 260 and DCHP servers 265. The AP 250 includes a MAC translator 254 and a local cache 256, which are used by the DHCP proxy 252 to remap MAC addresses used in the communications between the STAs 260 and the DCHP servers 265.

Thus, a STA 250 can send a DHCP request, and the DHCP proxy 252 of the AP 250 can select and return an IP address (using the MAC translator 254 and the local cache 256) essentially immediately since the IP address was previously obtained from a DHCP server 265 for a placeholder MAC address retained in the local cache 256. The pre-caching of MAC/IP address pairs in the local cache 256 allows the DHCP proxy 252 to select an IP address to respond to a client's DHCP request without having to send a request to the DHCP servers 265 for that specific client. Moreover, this DHCP response can be sent at essentially any point after the STA 260 is connected with the AP 250 in any manner. Note that this can occur outside of the BSS (Basic Service Set) or even inside the BSS.

Figure 2C:
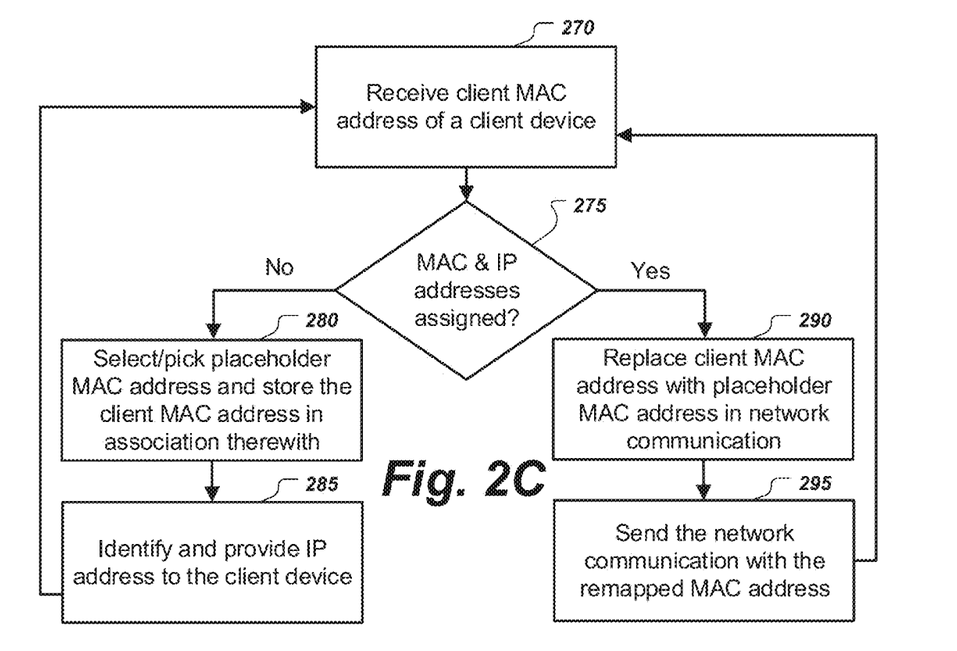
FIG. 2C shows an example of a process to use pre-cached IP addresses.

FIG. 2C shows an example of a process to use pre-cache IP addresses. The process of FIG. 2C can be implemented in software, firmware, hardware, or any combination thereof. The process can be implemented by an access point, according to some embodiments. For example, the process can be implemented by the access point 150. At 270, the access point receives a client MAC address of a client device. This reception can occur in many different types of network communications, including in the messages initially used to connect the client device with the network, the internetwork, or both, as well as in the network communications that occur after connections are fully established. For example, the client MAC address can be received in a DHCP request from the client.

At 275, the access point determines whether the client MAC address already has a placeholder MAC address and an IP address assigned therefor. This can involve checking, by the access point, a cache table maintained by the access point, such as described above. Many different systems and techniques can be used by the access point to cache and check for network and internetwork addresses. These can include, without limitation, programmed processor implementations that employ one or more data structures, such as database record(s) and/or hash map(s), as well as hardware implementations that employ one or more types of memory, such as random access memory device(s) and/or content addressable memory device(s).

At 280, when a placeholder MAC address has not yet been assigned to the client MAC address, the access point selects a placeholder MAC address, and the client MAC address is stored in association with the selected placeholder MAC address. The selection of the placeholder MAC address to be assigned can be random, the next available, or in accordance with some specified criteria. In some implementations, the access point can maintain a table of client activity on the network, and based on a threshold ageout, the access point can explicitly deauthenticate a client, which is aged out, to free up a placeholder MAC address. In other implementations, the number of placeholder MAC addresses can be set equal to the number of clients the access points supports, those avoiding a need to deauthenitcate a client to free up a placeholder MAC address for a connecting client. In addition, the association between the client MAC address and the selected placeholder MAC address can be made by saving the client MAC address in the appropriate location within the cache table.

At 285, the access point identifies the IP address that was previously associated with the selected placeholder MAC address. For example, the entry located in the cache table when selecting the placeholder MAC address can be read to retrieve the corresponding IP address. Also at 285, the access point provides the previously associated IP address to the client device. This can be done in various types of messages in various implementations. For example, in some implementations, the access point can add the IP address to a DHCP response sent to the client device, without having to send a request to DHCP servers responsive to the client's DHCP request.

The process continues back to 270. Further, at 290, when a placeholder MAC address has been previously assigned to the client MAC address received in a network communication at 270, then the access point directs the network communication in accordance with the association between the client MAC address and the previously associated placeholder M AC address. At 290, the client MAC address can be replaced with the placeholder MAC address in the network communication. At 295, the access point sends the network communication with the remapped MAC address.

Figure 3:
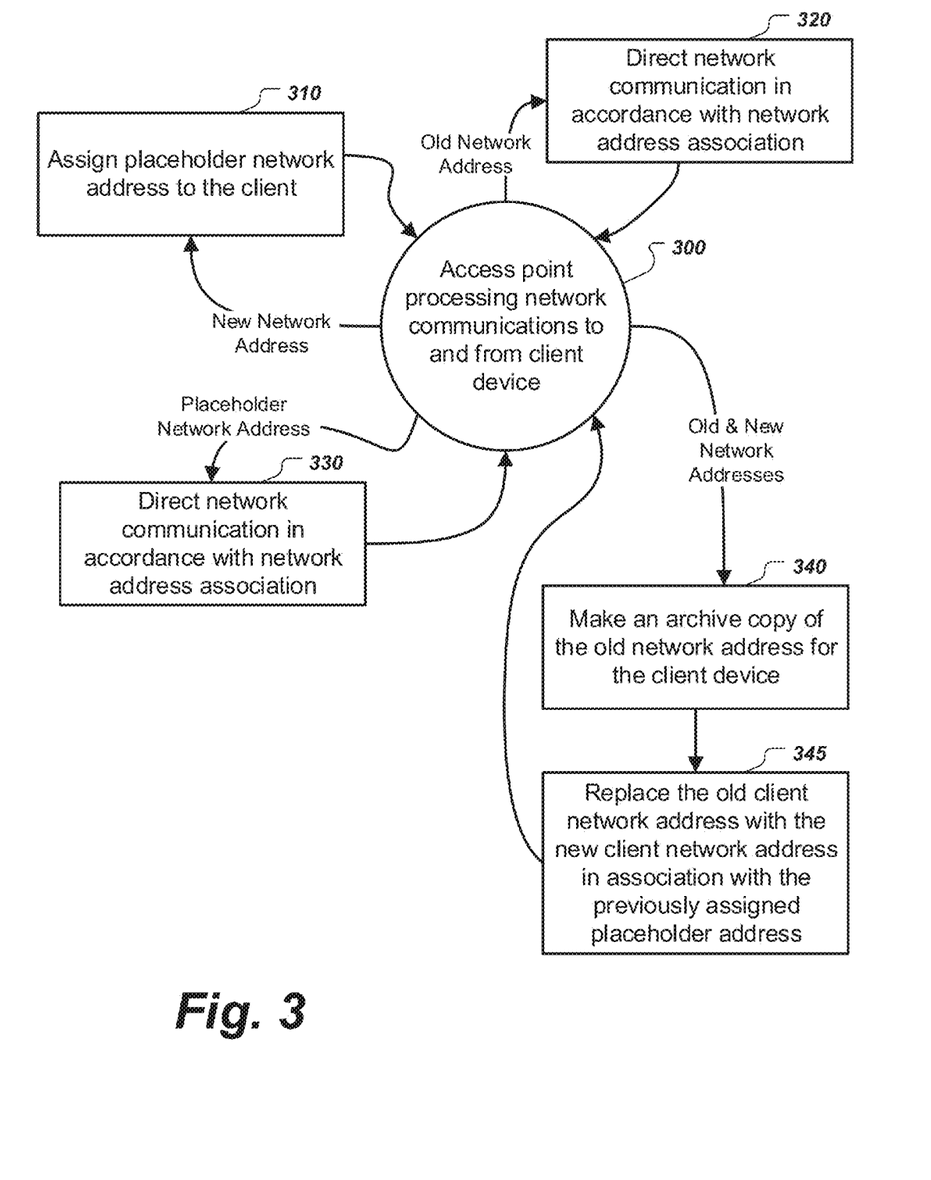
FIG. 3 shows an example of a process to use pre-cache internetwork addresses.

FIG. 3 shows an example of a process to use pre-cached internetwork addresses. At 300, the access point resides in its regular state of processing network communications to and from a client device. When a new client network address is received, a placeholder network address can be assigned to the client device at 310. For example, when a newly connected or connecting client device requests an IP address for its MAC address, the access point can select a placeholder MAC address and provide it corresponding pre-cached IP address, such as described above in connection with FIG. 2C. Further processing of network communications then proceeds at 300.

When an old client network address is received, a network communication can be directed in accordance with a retained association between the previously seen client network address and a placeholder network address chosen for it. For example, when a client device sends a message to the Internet, the access point can identify the client's MAC address and replace it with its associated placeholder MAC address, such as described above in connection with FIG. 2C, before sending the network communication on to the Internet. Further processing of network communications then proceeds at 300.

When a placeholder network address is received, a network communication can be directed in accordance with a retained association between the placeholder network address and a previously seen client network address assigned to it. For example, when a service provide sends a message to the client device, the access point can identify a placeholder MAC address and replace it with its associated client MAC address before sending the network communication on to the client device. Further processing of network communications then proceeds at 300.

In addition, in some implementations, the client device can update its network address, e.g., to provide added privacy. In such implementations, both an old network address for the client device and a new network address for the client device can be identified, e.g., in a change MAC address message sent by the client device to the access point. In response, the new network address for the client can be associated with the placeholder network address that was previously associated with the old network address for the client, before then directing further network communications to and from the client device in accordance with the association between the new network address for the client device and the placeholder network address selected previously. In some implementations, at 340, an archived copy of the old network address for the client device can be made, before replacing at 345 the old network address for the client with the new network address for the client in a cache that associates client network addresses (e.g., client MAC addresses) with placeholder network addresses (e.g., placeholder MAC addresses) and also internetwork addresses (e.g., previously assigned IP addresses).

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code), A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An access point data processing apparatus comprising:
   a cache memory configured to store a set of internetwork addresses of an internetwork in association with a set of local network addresses of a local computing device network; and
   processor electronics coupled with the cache memory, the processor electronics configured to (i) receive a client network address of a client device to be connected with the internetwork through the access point data processing apparatus, (ii) select one of the local network addresses to associate with the client network address of the client device, (iii) store the client network address in the cache memory in association with the selected one of the local network addresses, (iv) identify in the cache memory an internetwork addresses associated with the selected one of the local network addresses, (v) provide the identified internetwork address to the client device, and (vi) direct network communications to and from the client device in accordance with the association between the client network address and the selected one of the local network addresses, including replacing the client network address with the selected one of the local network addresses in outbound network communications, and replacing the selected one of the local network addresses with the client network address in inbound network communications.

2. The access point data processing apparatus of claim 1, wherein the processor electronics are further configured to generate the set of local network addresses, request the set of internetwork addresses using the generated set of local network addresses using a dynamic address assignment protocol, receive the set of internetwork addresses in accordance with the dynamic address assignment protocol, and store the received internetwork addresses in the cache memory in association with the local network addresses.

3. The access point data processing apparatus of claim 2, wherein the local network addresses are Media Access Control (MAC) addresses, the internetwork addresses are Internet Protocol (IP) addresses, and the dynamic address assignment protocol is Dynamic Host Configuration Protocol (DHCP).

4. The access point data processing apparatus of claim 3, wherein the access point data processing is configured to be a DHCP proxy for client devices connecting to the Internet through the access point data processing apparatus.

5. The access point data processing apparatus of claim 1, wherein the access point data processing apparatus is a WiFi access point.

6. The access point data processing apparatus of claim 1, comprising an integrated circuit (IC) device comprising the cache memory and the processor electronics.

7. The access point data processing apparatus of claim 1, comprising a non-transitory computer-readable medium, wherein the processor electronics comprise a hardware processor programmed with instructions stored in the non-transitory computer-readable medium.

8. The access point data processing apparatus of claim 1, wherein the client network address is a first client network address for the client device, and the processor electronics are further configured to identify a second client network address for the client device that replaces the first client network address, associate the second client network address with the selected one of the local network addresses, and direct further network communications to and from the client device in accordance with the association between the second client network address and the selected one of the local network addresses.

9. The access point data processing apparatus of claim 8, wherein the processor electronics are configured to associate the second client network address with the selected one of the local network addresses by making an archive copy of the first network address from the cache memory and then replacing the first client network address with the second client network address in the cache memory.

10. An access point data processing apparatus comprising:
    a cache memory configured to store a set of internetwork addresses of an internetwork in association with a set of local network addresses of a local computing device network; and
    processor electronics coupled with the cache memory, the processor electronics configured to (i) receive a client network address of a client device to be connected with the internetwork through the access point data processing apparatus, (ii) select one of the local network addresses to associate with the client network address of the client device, (iii) store the client network address in the cache memory in association with the selected one of the local network addresses, (iv) identify in the cache memory an internetwork addresses associated with the selected one of the local network addresses, (v) provide the identified internetwork address to the client device, and (vi) direct network communications to and from the client device in accordance with the association between the client network address and the selected one of the local network addresses;
    wherein the client network address is a first client network address for the client device, and the processor electronics are further configured to identify a second client network address for the client device that replaces the first client network address, associate the second client network address with the selected one of the local network addresses, and direct further network communications to and from the client device in accordance with the association between the second client network address and the selected one of the local network addresses.

11. The access point data processing apparatus of claim 10, wherein the processor electronics are configured to associate the second client network address with the selected one of the local network addresses by making an archive copy of the first network address from the cache memory and then replacing the first client network address with the second client network address in the cache memory.

12. A method comprising:
    requesting a set of internetwork addresses using a set of local network addresses of a local computing device network, wherein the requesting comprises using a dynamic address assignment protocol, and each local network address in the set of local network addresses is not assigned to any device on the local computing device network;
    receiving the set of internetwork addresses for an internetwork in accordance with the dynamic address assignment protocol;

storing, by an access point (AP) of the local computing device network, the set of internetwork addresses in association with the set of local network addresses;

receiving, by the AP of the local computing device network, a client network address of a client device to be connected with the internetwork through the AP;

selecting, by the AP of the local computing device network, one of the local network addresses to associate with the client network address of the client device;

storing, by the AP of the local computing device network, the client network address in association with the selected one of the local network addresses;

identifying, by the AP of the local computing device network, one of the stored internetwork addresses that was previously associated with the selected one of the local network addresses;

providing, by the AP of the local computing device network, the identified internetwork address to the client device; and directing, by the AP of the local computing device network, network communications to and from the client device in accordance with the association between the client network address and the selected one of the local network addresses, including replacing the client network address with the selected one of the local network addresses in outbound network communications, and replacing the selected one of the local network addresses with the client network address in inbound network communications.

13. The method of claim 12, comprising generating, by the AP of the local computing device network, the set of local network addresses.

14. The method of claim 12, wherein the local network addresses are Media Access Control (MAC) addresses, the internetwork addresses are Internet Protocol (IP) addresses, and the dynamic address assignment protocol is Dynamic Host Configuration Protocol (DHCP).

15. The method of claim 14, wherein providing the identified internetwork address to the client device comprises providing a previously cached IP address in a DHCP response to a DHCP request from the client device without having sent a DHCP request to the local computing device network using a MAC address of the client device.

16. The method of claim 12, wherein the AP comprises a WiFi access point.

17. The method of claim 12, wherein the client network address is a first client network address for the client device, and the method comprises:

identifying a second client network address for the client device that replaces the first client network address;

associating the second client network address with the selected one of the local network addresses; and directing further network communications to and from the client device in accordance with the association between the second client network address and the selected one of the local network addresses.

18. The method of claim 17, wherein associating the second client network address with the selected one of the local network addresses comprises:

making an archive copy of the first client network address; and replacing the first client network address with the second client network address in a cache that associates client network addresses with the local network addresses.

19. A method comprising:

requesting a set of internetwork addresses using a set of local network addresses of a local computing device network, wherein the requesting comprises using a dynamic address assignment protocol, and each local network address in the set of local network addresses is not assigned to any device on the local computing device network;

receiving the set of internetwork addresses for an internetwork in accordance with the dynamic address assignment protocol;

storing, by an access point (AP) of the local computing device network, the set of internetwork addresses in association with the set of local network addresses;

receiving, by the AP of the local computing device network, a client network address of a client device to be connected with the internetwork through the AP;

selecting, by the AP of the local computing device network, one of the local network addresses to associate with the client network address of the client device;

storing, by the AP of the local computing device network, the client network address in association with the selected one of the local network addresses;

identifying, by the AP of the local computing device network, one of the stored internetwork addresses that was previously associated with the selected one of the local network addresses;

providing, by the AP of the local computing device network, the identified internetwork address to the client device; and directing, by the AP of the local computing device network, network communications to and from the client device in accordance with the association between the client network address and the selected one of the local network addresses;

wherein the client network address is a first client network address for the client device, and the method comprises:

identifying a second client network address for the client device that replaces the first client network address;

associating the second client network address with the selected one of the local network addresses; and directing further network communications to and from the client device in accordance with the association between the second client network address and the selected one of the local network addresses.

20. The method of claim 19, wherein associating the second client network address with the selected one of the local network addresses comprises:

making an archive copy of the first client network address; and replacing the first client network address with the second client network address in a cache that associates client network addresses with the local network addresses.

21. A system comprising:

a local computing device network coupled with an internetwork; and an access point (AP) for the local computing device network, wherein the AP is configured to (i) request a set of internetwork addresses using a set of local network addresses using a dynamic address assignment protocol, (ii) receive the set of internetwork addresses in accordance with the dynamic address assignment protocol, (iii) store the received internetwork addresses in association with the set of local network addresses, (iv) receive a client network address of a client device to be connected with the internetwork through the AP, (v) select one of the local network addresses to associate with the client network address of the client device, (vi) store the client network address in association with the selected one of the local network addresses, (vii) identify one of the stored internetwork addresses that was previously associated with the selected one of the local network addresses, (viii) provide the identified internetwork address to the client device, and (ix) direct network communications to and from the client device in accordance with the association between the client network address and the selected one of the local network addresses, including replacing the client network address with the selected one of the local network addresses in outbound network communications, and replacing the selected one of the local network addresses with the client network address in inbound network communications.

22. The system of claim 21, wherein the dynamic address assignment protocol is Dynamic Host Configuration Protocol (DHCP), and the AP acts as a DHCP proxy for client devices connecting to the Internet through the AP.

23. The system of claim 21, wherein the client network address is a first client network address for the client device, and the AP is further configured to identify a second client network address for the client device that replaces the first client network address, associate the second client network address with the selected one of the local network addresses, and direct further network communications to and from the client device in accordance with the association between the second client network address and the selected one of the local network addresses.

24. The system of claim 23, wherein the AP is configured to associate the second client network address with the selected one of the local network addresses by making an archive copy of the first network address and then replacing the first client network address with the second client network address in a cache that associates client network addresses with the local network addresses.

25. A system comprising:
a local computing device network coupled with an internetwork; and
an access point (AP) for the local computing device network, wherein the AP is configured to (i) request a set of internetwork addresses using a set of local network addresses using a dynamic address assignment protocol, (ii) receive the set of internetwork addresses in accordance with the dynamic address assignment protocol, (iii) store the received internetwork addresses in association with the set of local network addresses, (iv) receive a client network address of a client device to be connected with the internetwork through the AP, (v) select one of the local network addresses to associate with the client network address of the client device, (vi) store the client network address in association with the selected one of the local network addresses, (vii) identify one of the stored internetwork addresses that was previously associated with the selected one of the local network addresses, (viii) provide the identified internetwork address to the client device, and (ix) direct network communications to and from the client device in accordance with the association between the client network address and the selected one of the local network addresses;
wherein the client network address is a first client network address for the client device, and the AP is further configured to identify a second client network address for the client device that replaces the first client network address, associate the second client network address with the selected one of the local network addresses, and direct further network communications to and from the client device in accordance with the association between the second client network address and the selected one of the local network addresses.

26. The system of claim 25, wherein the AP is configured to associate the second client network address with the selected one of the local network addresses by making an archive copy of the first network address and then replacing the first client network address with the second client network address in a cache that associates client network addresses with the local network addresses.

* * * * *